Jan. 4, 1944. E. M. MOREHOUSE 2,338,658
TEMPORARY HOLDING DEVICE FOR CONDUIT CLIPS
Filed Sept. 21, 1942
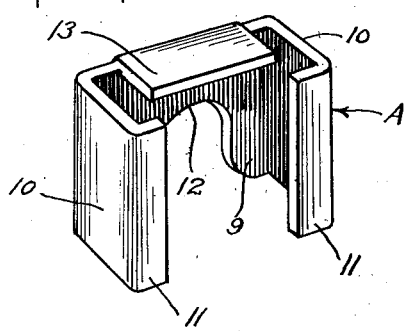
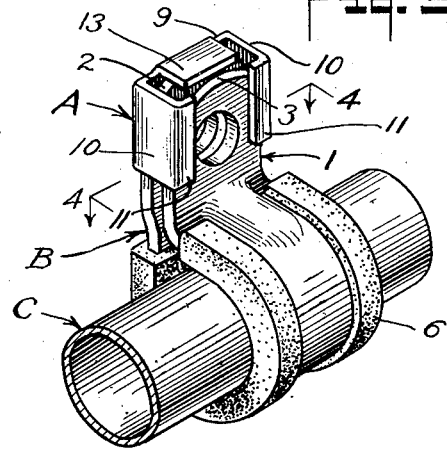
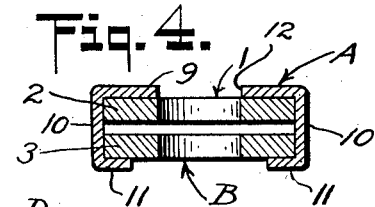
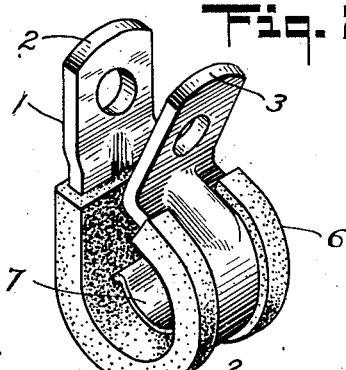
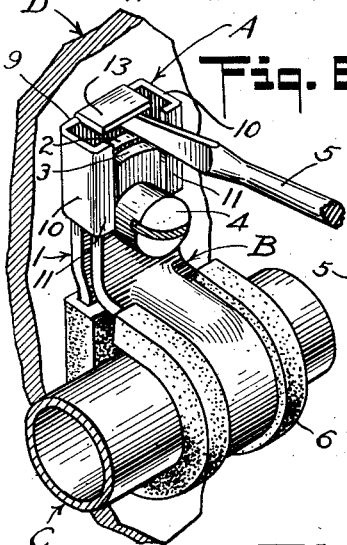
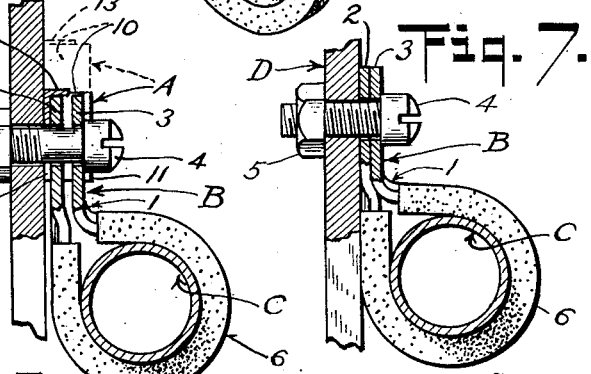
Inventor
EUGENE M. MOREHOUSE
By R. S. Berry
Attorney Patented Jan. 4, 1944

2,338,658

UNITED STATES PATENT OFFICE 2,338,658

TEMPORARY HOLDING DEVICE FOR CONDUIT CLIPS

Eugene M. Morehouse, Tujunga, Calif., assignor to Adel Precision Products Corp., a corporation of California Application September 21, 1942, Serial No. 459,215

7 Claims. (Cl. 248—74)

This invention relates to conduit clips for securing aircraft conduit lines to the structural parts adjacent to which said lines extend, such a clip including a relatively stiff conduit-embracing metal strap lined with a conduit-embracing strip of cushioning material and provided with apertured ends normally well spaced apart to facilitate the mounting of the clip on the conduit.

In installing a clip of the type above noted it is necessary to force the ends of the strap toward one another and hold them together in order that a bolt may be inserted therethrough and through the structural part of the aircraft which is to support the clip, and threaded into a nut, so that upon tightening the bolt the clip will be properly clamped on the conduit and securely fastened to said structural part. This forcing and holding of the ends of the strap together and the insertion of the bolt is usually accomplished with the fingers of one hand while the nut is held in place with the other hand and is a difficult operation due to the stiffness of the metal strap and the fact that in many cases the installation is made in confined places affording little or no hand room. In some cases two operators are required, one to force and hold the ends of the strap together with the fingers or a tool and the other to install the nut and bolt.

In my pending application Serial Number 453,263 filed August 1, 1942, for Sub-Assembly conduit clip, there is shown a metallic resilient slip-on type of clasp which may be quickly and easily fitted on the ends of the metallic strap of a conduit clip to hold said ends together whereby sub-assembly operations and an expeditious installation of the nut and bolt may be effected without the aforesaid difficulties and objections which are occasioned without the use of the clasp. The bolt passes through an opening in the clasp and thereby retains the clasp as a part of the clip unit, the clasp lying between one end of the strap and the structural member to which said end is bolted.

The primary object of the present invention is to provide a slip-on clasp of the character and for the purpose described, which, unlike the clasp of my earlier invention hereinbefore identified, may be quickly and easily removed from the ends of the strap once the bolt is started in the nut or threaded opening in which it is to be screwed, thereby providing for repeated use of the clasp, eliminating one part per clip unit, reducing the weight of the clip unit, effecting a saving in material per clip, and affording the desired direct contact of one end of the strap with the metal structural part to which the clip is bolted.

With the foregoing object in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a clasp embodying my invention;

Fig. 2 is a perspective view of a conduit clip to which the clasp is applicable;

Fig. 3 is a perspective view of the clip and clasp as when installed on a conduit line preliminary to mounting the clip as shown in Fig. 5;

Fig. 4 is a cross sectional view taken on the line 4—4 of Fig. 1;

Fig. 5 is a part-sectional, part-elevational view of the clip and clasp as when the bolt is started in the nut and the clasp may be removed;

Fig. 6 is a perspective view showing how the clasp may be removed;

Fig. 7 is a view similar to Fig. 6 showing the completely installed clip after the clasp has been removed.

Referring to the drawing more specifically, A designates a slip-on clasp embodying my invention and adapted to be removably mounted on a clip B for supporting a conduit C on a metallic structural part D of an aircraft, not shown.

The clip B here shown includes a metal strap 1 adapted to embrace the conduit and having opposed apertured ends 2 and 3 by means of which the strap is clamped around the conduit and secured to the structural member D, in this case a bolt 4 and a nut 5 being used to install the clip. The clip may include, as here shown, a cushion strip 6 of rubber, synthetic rubber, or similar cushioning material for absorbing vibrations and protecting the conduit from wear.

A flexible metallic bonding strip 7, as shown in Fig. 2, may be mounted on the cushion strip so as to contact the strap 1 and the conduit C in the manner well known in this art, to "ground" the conduit to the metal structural part D and prevent accumulation of static electricity in the conduit C.

The strap 1 is resilient and somewhat stiff to provide requisite strength and the ends 1 and 2 are normally well spaced apart to facilitate the mounting of the clip on the conduit. These ends must be brought close together to permit of the installation of the nut and bolt as shown in Fig. 5. This is a difficult operation in that the operator must force the ends together and insert the bolt with one hand while holding the nut in place to receive the bolt with the other hand. Even when the bolt is turned in a threaded opening in the support and no nut is required the operator is still required to perform with one hand the difficult operation of holding the ends of the strap together and inserting and screwing in the bolt.

The clasp A of my invention when applied to the clip B as shown in Fig. 3, an operation which may be easily effected before bolting the clip in place, will make it unnecessary for the operator to hold the ends 1 and 2 together while installing the nut and bolt.

As here provided the clasp A is formed of resilient sheet metal as a small rectangular sleeve partly open on one side and notched or cut away on the opposite side to allow the bolt to pass through the apertures in the ends 1 and 2 of the strap. Thus the clasp includes a wall 9 adapted to lie against the outer face of the end 2, opposed side walls 10 formed integral with and extended at right angles to the rear wall, and flanges or front wall portions 11 formed integral with the side walls and extending towards one another and adapted to lie against the outer surface of the end 1. The wall 9 is provided with a notch or slot 12 to accommodate the bolt which passes freely between the flanges 11, the notch opening at the inner edge of said wall. A flat lug 13 is formed integral with the outer edge of the wall 9 and extends forwardly a distance less than the width of the side walls 10 so as to act as a stop against the end 2 of the strap to limit the inward movement of the clasp when slipping it on the ends of the strap. This lug also facilitates the removal of the clasp as with a screw driver or similar tool 5 as shown in Fig. 6.

It should be noted that it is only necessary to bring the ends 1 and 2 of the strap towards one another into spaced parallel relation in order to slip the clasp over said ends so that the clasp will embrace and hold the ends in position to install the bolt and nut. The space between the flanges 11 and rear wall 9 of the clasp is greater than the combined thicknesses of said ends thereby making it unnecessary to force said ends into contact with one another in applying the clasp. The ends will spring apart in the clasp and forcibly engage the wall 9 and flanges 11 so that the clasp will be securely frictionally held in place during sub-assembly and installation operations.

After the bolt has been started in the nut the operator removes the clasp, as shown in Fig. 6, and then tightens the bolt to securely mount the clip as shown in Fig. 7.

The clasp may be used repeatedly so that a saving in metal and a reduction in weight is accomplished as compared to my earlier invention hereinbefore identified. Moreover, the removal of the clasp permits the end 2 to directly contact the structural part D and affords a better bonding action than where the clasp is maintained between the said end and said structural part.

I claim:

1. In a conduit supporting clip, a metal strap adapted to embrace a conduit and having opposed normally spaced apart and apertured ends providing for the clamping of the strap on the conduit and the mounting of the strap on a support, and a clasp adapted to embrace said ends and hold them together while a fastening is inserted through the apertures in said ends, said clasp having a notch adapted to register with said apertures and opening at a margin thereof to permit the removal of the clasp from said ends after said fastening is inserted through said apertures.

2. In a conduit supporting clip, a metal strap adapted to embrace a conduit and having opposed normally spaced apart and apertured ends providing for the clamping of the strap on the conduit and the mounting of the strap on a support, and a clasp adapted to embrace said ends and hold them together while a fastening is inserted through the apertures in said ends, said clasp having a notch adapted to register with said apertures and opening at a margin thereof to permit the removal of the clasp from said ends after said fastening is inserted through said apertures, and a stop lug on the clasp adapted to abut one of said ends to limit the inward movement of said clasp relative to said ends.

3. In a conduit supporting clip, a metal strap adapted to embrace a conduit and having opposed normally spaced apart and apertured ends providing for the clamping of the strap on the conduit and the mounting of the strap on a support, a clasp adapted to embrace said ends and hold them together while a fastening is inserted through the apertures in said ends, said clasp being in the form of a sleeve consisting of a wall adapted to engage one of said ends, side walls formed integral with and extending at right angles to the first named wall, and flanges on said side walls adapted to engage the other of said ends, said rear wall having a slot accommodating said fastening and opening at the inner end thereof to permit of removal of said clasp after the fastening is inserted through said ends.

4. A temporary holding means for conduit clips, comprising a sleeve-like clasp adapted to embrace the apertured ends of the strap of a conduit clip to hold said ends with their apertures in registration for reception of a fastening, said clasp including a wall adapted to lie against the outer face of one of said ends, side walls adapted to embrace the edges of said ends, and flanges on said side walls adapted to lie against the outer face of the other of said ends and spaced apart to accommodate the fastening therebetween.

5. A temporary holding means for conduit clips, comprising a sleeve-like clasp adapted to embrace the apertured ends of the strap of a conduit clip to hold said ends with their apertures in registration for reception of a fastening, said clasp including a wall adapted to lie against the outer face of one of said ends, side walls adapted to embrace the edges of said ends, and flanges on said side walls adapted to lie against the outer face of the other of said ends and spaced apart to accommodate the fastening therebetween, said flanges being spaced from said first named wall a distance greater than the thickness of the two ends of the strap.

6. A temporary holding means for conduit clips, comprising a sleeve-like clasp adapted to embrace the apertured ends of the strap of a conduit clip to hold said ends with their apertures in registration for reception of a fastening, said clasp including a wall adapted to lie against the outer face of one of said ends, side walls adapted to embrace the edges of said ends, flanges on said side walls adapted to lie against the outer face of the other of said ends and spaced apart to accommodate the fastening therebetween, and a lug on said clasp adapted to abut the outer extremity of one of said ends.

7. A temporary holding means for conduit clips, comprising a sleeve-like clasp adapted to embrace the apertured ends of the strap of a conduit clip to hold said ends with their apertures in registration for reception of a fastening, said clasp including opposed portions adapted to lie against the outer faces of said ends and having side walls adapted to embrace the edges of said ends, said opposed portions providing openings for receiving said fastening and which permit of removal of said clasp after the fastening is inserted through said ends.

EUGENE M. MOREHOUSE.